United States Patent [19]

Blincoe

[11] 4,140,971
[45] Feb. 20, 1979

[54] PROXIMITY DETECTION SYSTEM UTILIZING A MOVABLE MAGNET FOR SATURATING AN INDUCTOR CORE WHEREIN THE RISE TIME OF A PLURALITY OF SUCH INDUCTORS ARE COMPARED

[75] Inventor: Homer Blincoe, Tucker, Ga.

[73] Assignee: Electromagnetic Sciences, Inc., Atlanta, Ga.

[21] Appl. No.: 850,149

[22] Filed: Nov. 10, 1977

[51] Int. Cl.² ........................................... G01R 33/00
[52] U.S. Cl. .................................................. 324/208
[58] Field of Search ................................. 324/207, 208

[56] References Cited

U.S. PATENT DOCUMENTS 3,662,257  5/1972  Fujiwara ............................... 324/208

FOREIGN PATENT DOCUMENTS 909023  10/1962  United Kingdom ...................... 324/207

Primary Examiner—Robert J. Corcoran
Attorney, Agent, or Firm—Cushman, Darby & Cushman

[57] ABSTRACT

Apparatus and method is disclosed for determining the position of a mechanical part from among a plurality of discrete positions. An inductor with a saturable core is placed in proximity to each position so that a permanent magnet attached to the part saturates only the core nearest the part, thereby reducing the inductance of that particular inductor. The variation in inductances are detected by comparing voltage rise times across a current limiting resistor serially connected to each inductor. The voltage across the resistor connected to the inductor nearest the position of the part will have the shortest rise time. In a two position embodiment, the variation in rise times is detected by a R/S flip-flop with each input coupled to one each of the inductors.

8 Claims, 1 Drawing Figure

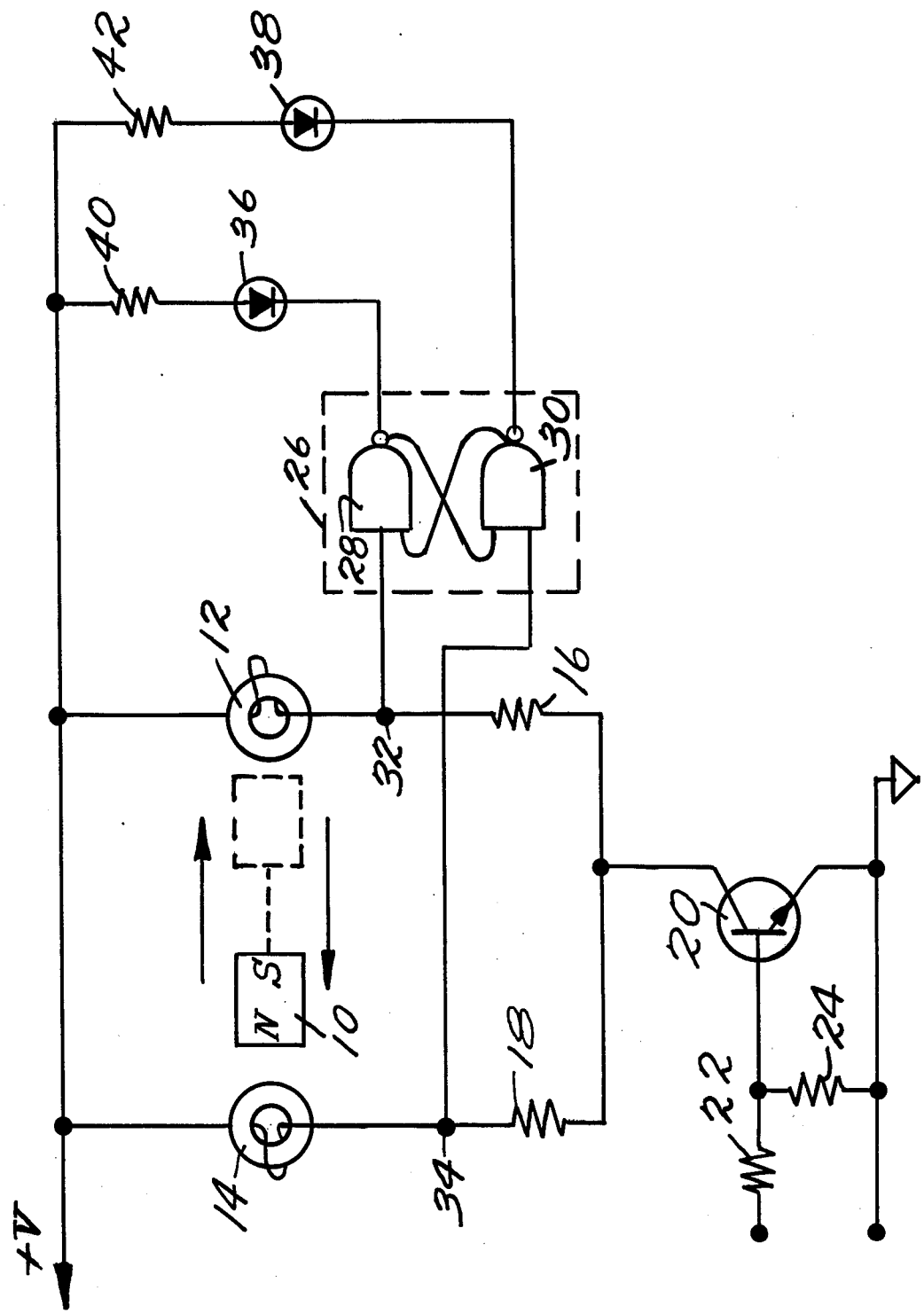

PROXIMITY DETECTION SYSTEM UTILIZING A MOVABLE MAGNET FOR SATURATING AN INDUCTOR CORE WHEREIN THE RISE TIME OF A PLURALITY OF SUCH INDUCTORS ARE COMPARED

This application relates generally to apparatus and method for determining the position of a mechanical part from among a plurality of discrete positions. For example, it could advantageously be employed to determine the location of a mechanical waveguide switch. It employs the saturation properties of a wire wound inductor on a ferromagnetic core in the presence of a magnetic field. Upon saturation of the core, the inductance of the inductor becomes greatly reduced.

Prior apparatus and method for detecting position using a saturable core with a permanent magnet are generally known. In U.S. Pat. No. 3,174,056, to Leavitt et al. issued Mar. 16, 1965 and U.S. Pat. No. 3,707,686, to Uekusa et al. issued Dec. 26, 1972, an inductor with a saturable core is part of a resonant circuit. The position of a permanent magnet in relation to the core varies the inductance of the inductor, thereby altering the frequency at which the circuit resonates. U.S. Pat. No. 3,161,387, to Jutier, issued Dec. 15, 1964, makes use of a saturable core with a primary winding which functions as an inductor in an oscillator circuit, and a secondary winding which functions as a pick-up in a detector circuit. The positioning of a metallic object with respect to the core and a fixed permanent magnet alters the path of flux lines from the magnet thereby altering the degree of saturation of the core. The variation and the degree of saturation causes a variation in the amount of current induced in the secondary winding, which variation is sensed by the detector circuit. In U.S. Pat. No. 3,662,257 to Fugiwara, issued May 9, 1972, the residual inductance in a saturable core created by a primary winding or by a permanent magnet is sensed by a secondary winding to detect whether the toroidal inductor has been positioned near the magnet since the previous detection. U.S. Pat. No. 3,048,818, to Burckhardt et al. issued Aug. 7, 1962, senses the transition of a moving part from one zone to an adjacent zone. The zone boundary is determined by a fixed permanent magnet which reverses polarity of a first moving magnet on the part so that a wire wound inductor on a ferromagnetic core on the part, positioned between the first moving magnet and a second moving magnet, is saturated upon every other polarity reversal.

In the present invention, a magnet is attached to a mechanical part which can be in any one of a number of positions, and an inductor with a saturable core is placed near enough to each part position so that only the inductor core nearest the part saturates. The inductances of the inductors are periodically compared by applying a voltage across the inductors and comparing the voltage rise times of the inductors. The most rapid rise time indicates the lowest inductance and therefore the inductor with the saturated core.

Thus the present invention provides a simple and unique method of position detection using the voltage characteristics of an inductor. The past position of the part or the movement of the part across a boundary need not be detected or recalled so that the invention can remain deactivated until knowledge concerning position is desired, thus effecting a savings in energy.

These and other objectives and advantages of the invention will become more apparent and more readily appreciated from the following detailed description of the presently preferred exemplary embodiment of the invention taken in conjunction with the accompanying drawing which shows a circuit diagram of the invention.

In FIG. 1, permanent magnet 10 is attached to the mechanical part, such as a waveguide switch, (not shown) whose position is to be monitored. Nearly identical toroidal inductors 12 and 14, having saturable cores, are each placed near a position of the mechanical part, so that when the part is in the position near the inductor, the core of the inductor saturates. In the drawing the part and magnet 10 are near inductor 14 thereby saturating only inductor 14. A variety of core materials could be utilized, but Ferronics B material, made by the Ferronics Corp., and MN-60 material made by the Cer-mag Corp., are both practical. The size of the toroid can vary, of course, but one with an approximately 0.2 inch outside diameter and a 0.1 inch thickness with 25 turns of #34 wire is suitable. Considerably smaller toroids can give a more exact position indication. One terminal each of inductors 12 and 14 are connected to a positive voltge, while the other terminals of inductors 12 and 14 are serially connected to current limiting resistors 16 and 18, respectively. An impedance across inductors 12 and 14 ten times the resistance of resistors 16 and 18 has been found to be effective. The other terminals of resistors 16 and 18 are connected to the collector of transistor 20. Interrogation pulses are supplied through bias resistors 22 and 24 to the base of transistor 20 to control its operation.

R/S flip-flop 26 is composed of two NAND gates 28 and 30, the output of each gate being one of the inputs of the other. The two remaining inputs are connected to inductors 12 and 14 at points 32 and 34, respectively. Although any type of R/S flip-flop could be used, two 74LS132 schmitt trigger NAND gates, interconnected as described above, has been used successfully. The output terminals of gates 28 and 30 are connected to the cathodes of light emitting diodes 36 and 38, respectively, the anodes of which are connected through current limiting resistors 40 and 42, respectively, to a positive voltage.

In operation, at selected times, a positive interrogation pulse is supplied to the base of transistor 20 through resistors 22 and 24 causing transistor 20 to conduct. The interrogation pulse can be automatically generated by the same control that is used to cause the mechanical part to move, by a computer automatically, or by a manual switch. Current flows from the positive supply through inductors 12 and 14 and resistors 16 and 18 respectively, and through transistor 20 to ground. The result is that the voltage at points 32 and 34 are momentarily (for one or two microseconds) below 0.5 volts. This voltage is conducted to the R/S flip-flop. Initially, when each NAND gate has one low input, the output of each will be high. After a time determined by the RL time constants of inductor 12 and resistor 16, and inductor 14 and resistor 18, points 32 and 34 will again return to the supply voltage. Since the inductance of the saturated core will be less than one-fifth of its original value, the voltage at point 34, at the connection of saturated inductor 14 to resistor 18, will remain below 0.5 volts for a significantly shorter time than the voltage at point 32. The input of R/S flip-flop 26 which rises last, i.e., the input connected to point 32 will set flip-flop 26, so that the output of gate 28 will be high while the output of gate 30 will be low. Thus, the output of the gate whose input is connected to the saturated inductor becomes low, permitting current to flow through the associated LED (i.e., LED 38). The outputs of the two gates can be conducted any reasonable distance for a remote indication. Instead of or in addition to the LED displays, the output of the flip-flop could be connected to either computer interface circuits or to the trigger of a strobe light.

Although only one exemplary embodiment of this invention has been described in detail above, those skilled in the art will readily appreciate that many modifications are possible in the exemplary embodiment without materially departing from the novel teachings and advantages of this invention. For example, instead of detecting the position of the mechanical part from between two discrete positions, the invention may be expanded to detect the position from among any number of discrete positions, by increasing the number of inductors to match the number of positions. Those skilled in the art are familiar with multi-input devices which detect the first input to change states. Accordingly, all such modifications are intended to be included within the scope of this invention as defined in the following claims.

What is claimed is:

1. Apparatus for determining the position of a mechanical part from among a plurality of discrete positions comprising:
    a magnet mounted on said part;
    at least two substantially identical inductors having saturable cores, each of said inductors being located near one of said discrete positions so that when said part is in that position, said core saturates;
    means for simultaneously applying, at selected times, substantially identical voltage levels across said inductors; and
    means for comparing the voltage rise times of said inductors to determine the first of said inductors to develop thereacross a predetermined threshold voltage after each of said selected times.

2. Aparatus as in claim 1, further comprising a mechanical waveguide switch, said magnet being mounted on the movable component of said switch and each of said inductors being positioned near said magnet when said switch is respectively, in each of a plurality of positions so that said apparatus is used to determine the location of said mechanical waveguide switch.

3. Aparatus as in claim 1 wherein said inductors having saturable cores are toroidal inductors wound on ferrite forms.

4. Apparatus as in claim 1 wherein said magnet is a permanent magnet.

5. Apparatus as in claim 1 wherein:
    said part can be in either of two discrete positions;
    said means for applying further comprises:
        a plurality of substantially identical current limiting resistors, each one serially connected to one each of said inductors forming resistor-inductor pairs, and
        means for simultaneously supplying, at selected times, substantially identical voltages across said pairs, the more positive voltages being applied to the terminals of said inductors not connected to said resistors and the less positive voltages being applied to the terminals of said resistors not connected to said inductors; and said means for comparing further comprises:
    an R/S flip-flop, a first input of said flip-flop being connected between said resistor and said inductor of a first said pair, a second input of said flip-flop being connected between said resistor and said inductor of a second said pair,
    a first indicating means connected to a first output of said flip-flop, and
    a second indicating means connected to a second output of said flip-flop, said second output inverted from said first output, so that when said part is in the position near said inductor of said first pair, said first indicating means is powered at said selected times and when said part is in the position near said inductor of said second pair, said second indicating means is powered at said selected times.

6. Method for determining the position of a mechanical part from among a plurality of discrete positions including:
    mounting a magnet on said part;
    placing one each of at least two substantially identical inductors having saturable cores, near each one of said discrete positions so that when said part is in that position, said core saturates;
    simultaneously applying, at selected times, substantially identical voltage levels across said inductors; and
    comparing the voltage rise times of said inductors to determine the first of said inductors to develop thereacross a predetermined threshold voltage after each of said selected times.

7. Method as in claim 6, wherein said mounting step mounts said magnet on the movable component of a mechanical waveguide switch, and said placing step places each of said inductors near said magnet when said switch is respectively, in each of a plurality of positions so that said method is used to determine the location of said mechanical waveguide switch.

8. Method as in claim 6 wherein:
    said part can be in either of two discrete positions;
    said applying step further includes:
        serially connecting one each of a plurality of substantially identical current limiting resistors, to each one of said inductors so as to form resistor-inductor pairs, and
        simultaneously supplying, at selected times, substantially identical voltages across said pairs, the more positive voltages being applied to the terminals of said inductors not connected to said resistors and the less positive voltages being applied to the terminals of said resistors not connected to said inductors; and said comparing step further includes:
    connecting a first input of an R/S flip-flop between said resistor and said inductor of a first said pair, and connecting a second input of said flip-flop between said resistor and said inductor of a second said pair,
    connecting a first indicating means to a first output of said flip-flop, and
    connecting a second indicating means to a second output of said flip-flop, said second output inverted from said first output, so that when said part is in the position near said inductor of said first pair, said first indicating means is powered at said selected times and when said part is in the position near said inductor of said second pair, said second indicating means is powered at said selected times.

* * * * *